United States Patent
Vilou

[19]
[11] Patent Number: 6,050,233
[45] Date of Patent: Apr. 18, 2000

[54] CONTROLLER FOR A VEHICLE STARTER MOTOR

[75] Inventor: Gérard Vilou, Tassin, France

[73] Assignee: Valeo Equipments Electriques Moteur, Creteil, France

[21] Appl. No.: 09/177,351

[22] Filed: Oct. 23, 1998

[30] Foreign Application Priority Data

Oct. 24, 1997 [FR] France .................................. 97 13351

[51] Int. Cl.[7] .................................................. F02N 11/08
[52] U.S. Cl. ...................................... 123/179.3; 290/38 R
[58] Field of Search ......................... 123/179.3; 290/38 R

[56] References Cited

U.S. PATENT DOCUMENTS

| | | | |
|---|---|---|---|
| 3,594,029 | 7/1971 | Holt | 290/38 R |
| 4,104,534 | 8/1978 | Hill et al. | 123/179.3 |
| 4,883,028 | 11/1989 | Wu | 123/179.3 |
| 4,901,690 | 2/1990 | Cummins et al. | 123/179.3 |
| 5,094,199 | 3/1992 | Griffin | 123/179.3 |

FOREIGN PATENT DOCUMENTS

| | | |
|---|---|---|
| 0 526 307 | 2/1993 | European Pat. Off. . |
| 32 33 596 | 3/1984 | Germany . |
| 41 06 247 | 4/1992 | Germany . |
| 93 19 621 U | 3/1994 | Germany . |
| 43 38 638 | 6/1994 | Germany . |
| 2 239 569 | 7/1991 | United Kingdom . |

*Primary Examiner*—Andrew M. Dolinar
*Attorney, Agent, or Firm*—Morgan & Finnegan, LLP

[57] ABSTRACT

A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold.

14 Claims, 1 Drawing Sheet

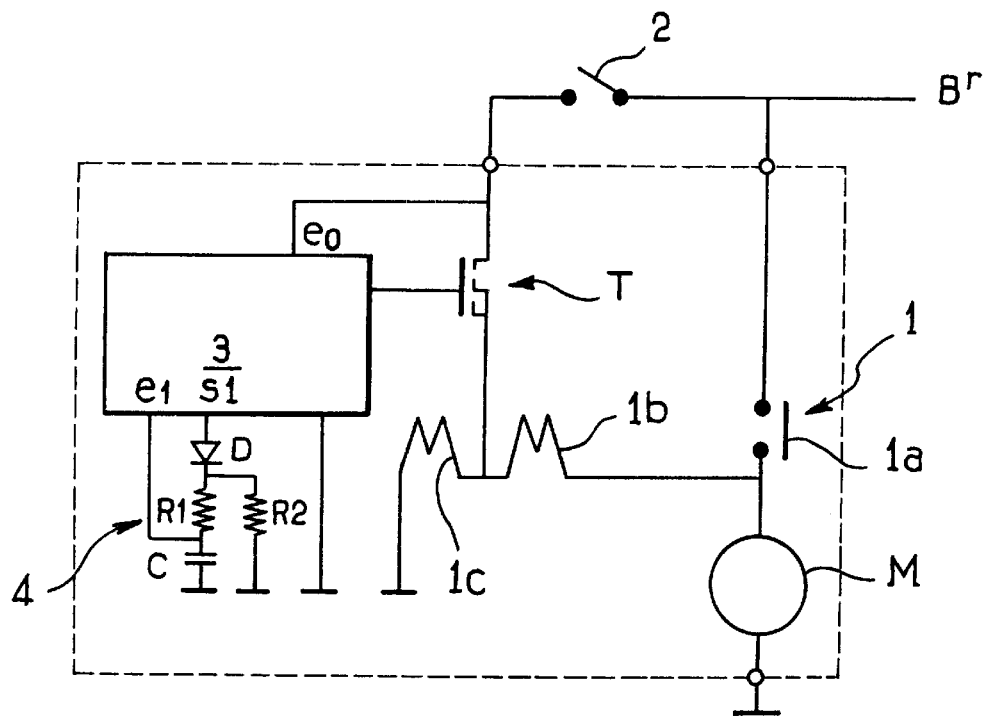
FIG_1
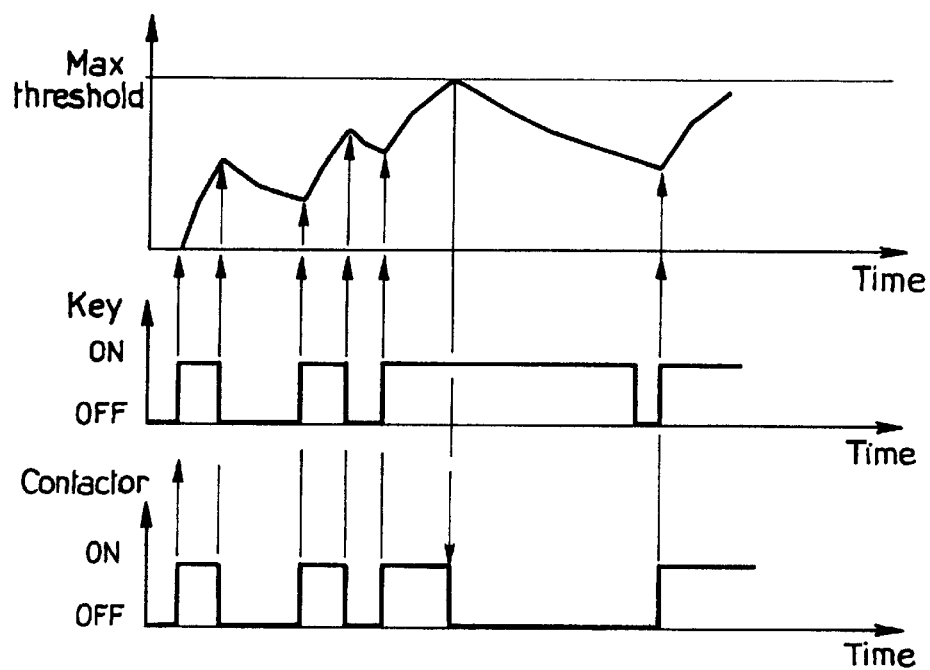
FIG_2a
FIG_2b
FIG_2c

CONTROLLER FOR A VEHICLE STARTER MOTOR

The present invention relates to controllers for vehicle starter motors.

BACKGROUND OF THE INVENTION

Controllers for controlling a starter motor electronically are now conventional. They generally include a control unit which receives as an input a flag concerning the open or closed state of a starter switch—which switch is generally actuated by the vehicle key—and which controls the application of power to the coil(s) of a power contactor which, when closed, serves to power the electric starter motor. The power contactor includes, in particular, a moving core which, at the end of its stroke, closes the power supply circuit for the electric starter motor and whose displacement causes the starter pinion to be entrained towards the ring gear. This control unit also serves to control other functions such as automatically stopping the starter or indeed providing protection against surge currents or against operator error such as trying to start an engine that is already running. The control unit is either integrated within the starter itself, or else it is housed externally thereto in a special box. In another variant it may be constituted by an already-existing electronic system, such as the injection and ignition processor.

It can happen, particularly in the event of some kind of vehicle breakdown, that the user makes numerous successive attempts at operating the starter motor in the hope of starting the engine.

Each time it is activated, the starter motor heats up quickly and its temperature rises significantly—by a few degrees—as a function of its operating characteristics and as a function of the length of time it is activated. The lengths of the pauses between successive attempts at starting are of the order of a few seconds and they enable the starter motor to cool down to some extent. However, its rate of cooling is much slower than its rate of heating, such that as a general rule the starter motor is far from returning to its initial temperature when it is reactivated.

This gives rise to a cumulative heating effect which, if too many attempts are made or if they last for too long, will lead to the starter motor being destroyed.

Unfortunately, it turns out to be impossible to protect the starter motor against being destroyed in that way merely by requiring sufficiently lengthy pauses between two successive closures of the power contactor: the control unit, which is generally constituted by a microprocessor, loses power between two successive actuations of the contact switch, and that makes it impossible to use the internal clock of said control unit for measuring time.

OBJECTS AND SUMMARY OF THE INVENTION

An object of the invention is therefore to provide a controller for electronically controlling a vehicle starter motor in such a manner as to protect it against damage, in particular thermal damage, of the kind that can arise if the starter motor is actuated too many times in succession.

To this end, the invention provides a controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold.

The controller advantageously further exhibits the following characteristics taken singly or in any technically feasible combination:
- the RC circuit is constituted by two parallel-connected branches, one comprising a series connection of first resistor means and the capacitor means, the other comprising second resistor means;
- the control means comprise a microprocessor which controls the application of power to the electric starter motor as a function in particular of the closed or open state of the starter switch, and the RC circuit is fed with voltage via an output of said microprocessor;
- the RC circuit is connected to a voltage supply terminal via the starter switch, optionally in series with a voltage regulator circuit;
- the control means comprise a microprocessor controlling the supply of power to the electric starter motor as a function in particular of the closed or open state of the starter switch, and a voltage corresponding to the voltage across the terminals of the capacitor means of the RC circuit is injected into an input of said microprocessor, said microprocessor causing the supply of power to the starter motor to be blocked when said voltage exceeds a given threshold;
- the means which prevent power being applied to the starter motor when the voltage across the terminals of the capacitor means of the RC circuit exceeds a given threshold include an analog threshold comparator circuit;
- the ratio between the charging time constant and the discharging time constant is substantially equal to the ratio between the heating time constant and the cooling time constant of the starter motor;
- the means which prevent power being applied to the starter motor when the voltage across the terminals of the capacitor means of the RC circuit exceeds a given threshold prevent power being reapplied to the starter motor until said voltage has dropped below a second threshold lower than the first;
- the voltage threshold above which the supply of power to the starter motor is prevented varies as a function of one or more operating parameters of the starter motor and/or of the engine; and
- the resistor means in series with the capacitor means of the RC circuit are of resistance that varies as a function of temperature.

BRIEF DESCRIPTION OF THE DRAWING

Other characteristics and advantages of the invention appear further from the following description. The description is purely illustrative and non-limiting. It should be read with reference to the accompanying drawing, in which:

FIG. 1 shows a controller constituting one possible embodiment of the invention; and FIGS. 2a to 2c show an operating sequence for the FIG. 1 controller.

MORE DETAILED DESCRIPTION

FIG. 1 shows the electric starter motor M of a vehicle, together with the power contactor 1 which controls the supply of power to the motor M.

The starter motor M is connected between ground and a terminal B+ that is at the power supply voltage of the battery.

The power contactor is constituted by a relay having driving and holding coils 1b and 1c and a contact 1a which is interposed between the power supply terminal B+ and the starter motor M.

An end common to both coils 1b and 1c is connected to the B+ terminal by means of a controlled switch (transistor T) in series with a vehicle starter switch (switch 2, e.g. as actuated by the vehicle key).

The driving coil 1b is connected between said common end and a point between the contact 1a and the motor M.

The holding coil 1c is mounted between said common end and ground.

By way of example, the switch T can be a transistor of the MOSFET type.

It is controlled by a control unit 3 which is a microprocessor that generates a control voltage on the grid of said transistor T so as to control the sequence with which power is applied to the coils 1b and 1c as a function both of the various stages of operation of the starter (power to drive the contact, power to hold the contact closed, automatically stopping the starter after the engine has started, etc.) and also as a function of the various protective actions that the microprocessor 3 can control (protection against starting again once the engine is running, for example).

To generate the control voltage, the control unit 3 takes into account in particular the open or closed state of the switch 2. To this end, said unit 2 has an analog input "e0" having injected thereon the voltage of a point between the starter switch 2 and the controlled switch T.

Also, in accordance with the invention, the controller shown in FIG. 1 has means 4 that prevent the motor M being actuated on successive occasions that are too close together.

The means 4 comprise, in particular, an RC type circuit having a charging time constant that is smaller than its discharging time constant and which charges or discharges depending on whether the switch 2 is closed or open.

The means 4 also have means enabling power supply to the motor M to be prevented whenever the voltage across the terminals of the capacitor C is greater than a given threshold (which means that the capacitor has not discharged sufficiently from the most recent occasion(s) on which the starter switch was closed).

In the example shown in FIG. 1, the RC circuit is constituted by two branches connected in parallel, one comprising a resistor R1 in series with the capacitor C, and the other comprising a single resistor R2.

These two branches are connected between ground and an analog output "s1" of the microprocessor 3, which output supplies voltage to said branches when the switches 2 and T are closed.

A diode D which conducts from said output s1 to ground is interposed between said output s1 and said branches R1-C and R2.

The voltage across the terminals of the capacitor is injected via an analog input "e1" to the microprocessor 3 and the microprocessor causes the switch T to be switched off whenever the key-operated switch 2 is closed while said voltage is greater than a given threshold. It causes the switch T to close only once said voltage has dropped below said threshold.

The circuit operates as follows.

When the switch 2 is closed, the microprocessor 3 is powered.

Its output "s1" enables the capacitor C to be charged via the resistor R1 throughout the time that power is applied to the starter motor M.

When the switch 2 is opened, the microprocessor 3 is no longer powered, so the capacitor C stops being charged.

It then discharges via the resistors R1 and R2 in series.

Because of the presence of the resistor R2 in the discharge circuit, the time constant for discharging the capacitor is longer than the time constant for charging it.

The ratio between the charging and discharging time constants is preferably chosen to be substantially equal to the ratio between the heating and cooling time constants of the starter motor, thus making it possible at any instant to have a good representation of the state of starter motor heating by measuring the voltage across the terminals of the capacitor.

This voltage is continuously monitored by the microprocessor via its analog input "e1".

Variations in the voltage across the capacitor C as a function of time are shown by way of example in FIG. 2a.

Each time the switch 2 is closed (FIG. 2b shows the opening and closing sequence), the capacitor C charges while the starter motor is in operation. Discharging takes place when the switch 2 is open, i.e. while the starter motor is stopped.

If starts are close enough together, the voltage across the terminals of the capacitor C rises progressively as does the temperature of the starter motor.

Once the voltage exceeds a predetermined threshold corresponding to a temperature state that is below a maximum limit temperature, the microprocessor 3 turns off the contactor-controlling transistor, thereby preventing power being applied to the starter motor and thus avoiding any irreversible damage thereto due to overheating. This is shown in FIG. 2c where there can be seen a sequence of commands applied to the contactor 1.

A new attempt at starting can take place only after the voltage has dropped back below the cutoff threshold by an amount lying in the range 0 to 100% of the threshold.

Variant embodiments other than that described above are naturally possible.

In particular, instead of being powered by the microprocessor 3, the RC circuit may be powered by the vehicle key, e.g. via a voltage regulator circuit.

Also, instead of injecting the voltage across the terminals of the capacitor C into the microprocessor 3, it is possible to provide for the capacitor C to be connected across the terminals of an analog circuit which includes a threshold comparator, optionally together with an input amplifier, said circuit then switching off the transistor T whenever the voltage injected to the said comparator exceeds said threshold.

In another variant, the voltage threshold below which the starter motor M is prevented from operating can vary as a function of one or more parameters, in particular as a function of the temperature of the starter motor, of the temperature of the engine, of the electric current drawn while starting, of the speed at which the engine is driven, of the frequency of ripple in battery voltage or current due to the engine passing through its compression points, or indeed of any other information from which it is possible to make a deduction concerning the extent to which the starter motor is overheating.

In addition, the charging resistance of the capacitor may include elements that vary as a function of ambient temperature such as a negative temperature coefficient (NTC) resistor.

Also, the capacitor C can be charged using a chopped voltage or a string of pulses having a duty ratio that is variable so as to modulate charging continuously as a function of the heating characteristics that appear during starting.

As will be understood, a controller of the type described above is a simple controller that provides thermal protection for an electric starter motor without requiring temperature sensors to be placed in critical zones of the motor and without requiring connections between such sensors and the circuit board on which the starter motor controller is mounted.

I claim:

1. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the RC circuit is constituted by two parallel-connected branches, one comprising a series connection of first resistor means and the capacitor means, the other comprising second resistor means.

2. A controller according to claim 1, wherein the resistor means in series with the capacitor means of the RC circuit are of resistance that varies as a function of temperature.

3. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the control means comprise a microprocessor which controls the application of power to the electric starter motor as a function in particular of the closed or open state of the starter switch, and wherein the RC circuit is fed with voltage via an output of said microprocessor.

4. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the control means comprise a microprocessor controlling the supply of power to the electric starter motor as a function in particular of the closed or open state of the starter switch, and wherein a voltage corresponding to the voltage across the terminals of the capacitor means of the RC circuit is injected into an input of said microprocessor, said microprocessor causing the supply of power to the starter motor to be blocked when said voltage exceeds a given threshold.

5. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the ratio between the charging time constant and the discharging time constant is substantially equal to the ratio between the heating time constant and the cooling time constant of the starter motor.

6. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the means which prevent power being applied to the starter motor when the voltage across the terminals of the capacitor means of the RC circuit exceeds a given threshold prevent power being reapplied to the starter motor until said voltage has dropped below a second threshold lower than the first.

7. A controller for a vehicle starter motor, the controller comprising means for applying power to the electric starter motor as a function in particular of the open or closed state of a starter switch, wherein said means include in particular an RC type circuit having a charging time constant that is shorter than its discharging time constant and that charges and discharges depending on whether the starter switch is closed or open, said control means also including means for preventing power being applied to the starter motor when the voltage across the terminals of the capacitor means of the RC circuit exceeds a given threshold, and wherein the voltage threshold above which the supply of power to the starter motor is prevented varies as a function of one or more operating parameters of the starter motor and/or of the engine.

8. A controller for a vehicle starter motor, the controller comprising:
   a microprocessor for monitoring the level of heat of a starter motor comprising means for determining whether a starter switch is open or closed, the microprocessor outputs a supply voltage when the starter switch is closed;
   a first circuit having a capacitor for receiving the supply voltage, the first circuit having a charging time constant that is shorter than its discharging time constant, and the first circuit charges and discharges according to the supply voltage;
   a second circuit for controlling a power supply source to the starter motor, the second circuit being operatively connected to the microprocessor and being controlled by the microprocessor to prevent power to be applied to a starter motor when the temperature of the starter motor exceeds a threshold temperature.

9. The device according to claim 8 wherein the first circuit is an RC-type circuit.

10. The device according to claim 9 wherein the ratio between the charging and discharging time constants is substantially equal to the ratio between a heating time constant and a cooling time constant of the starter motor.

11. The device according to claim 10 wherein the microprocessor monitors the temperature of the starter motor by measuring the voltage across the capacitor.

12. The device according to claim 11 wherein the capacitor has a predetermined threshold voltage wherein the amount of time for the capacitor to reach the threshold voltage corresponds to the amount of time the starter motor requires to reach a maximum limit temperature.

13. The device according to claim 12 wherein the microprocessor controls the second circuit to prevent power from being applied to the starter motor when the voltage across the capacitor exceeds the threshold voltage.

14. The device according to claim 13 wherein a resistance of a resistor of the RC-type circuit varies as a function of the temperature of the starter motor.

* * * * *